Sept. 20, 1949. M. G. BROWN ET AL 2,482,650
OPTICAL COMPARISON HEMOGLOBINOMETER HAVING A
REFLECTOR SUPPORTING TRANSVERSE PARTITION
Filed Dec. 26, 1945 3 Sheets-Sheet 1
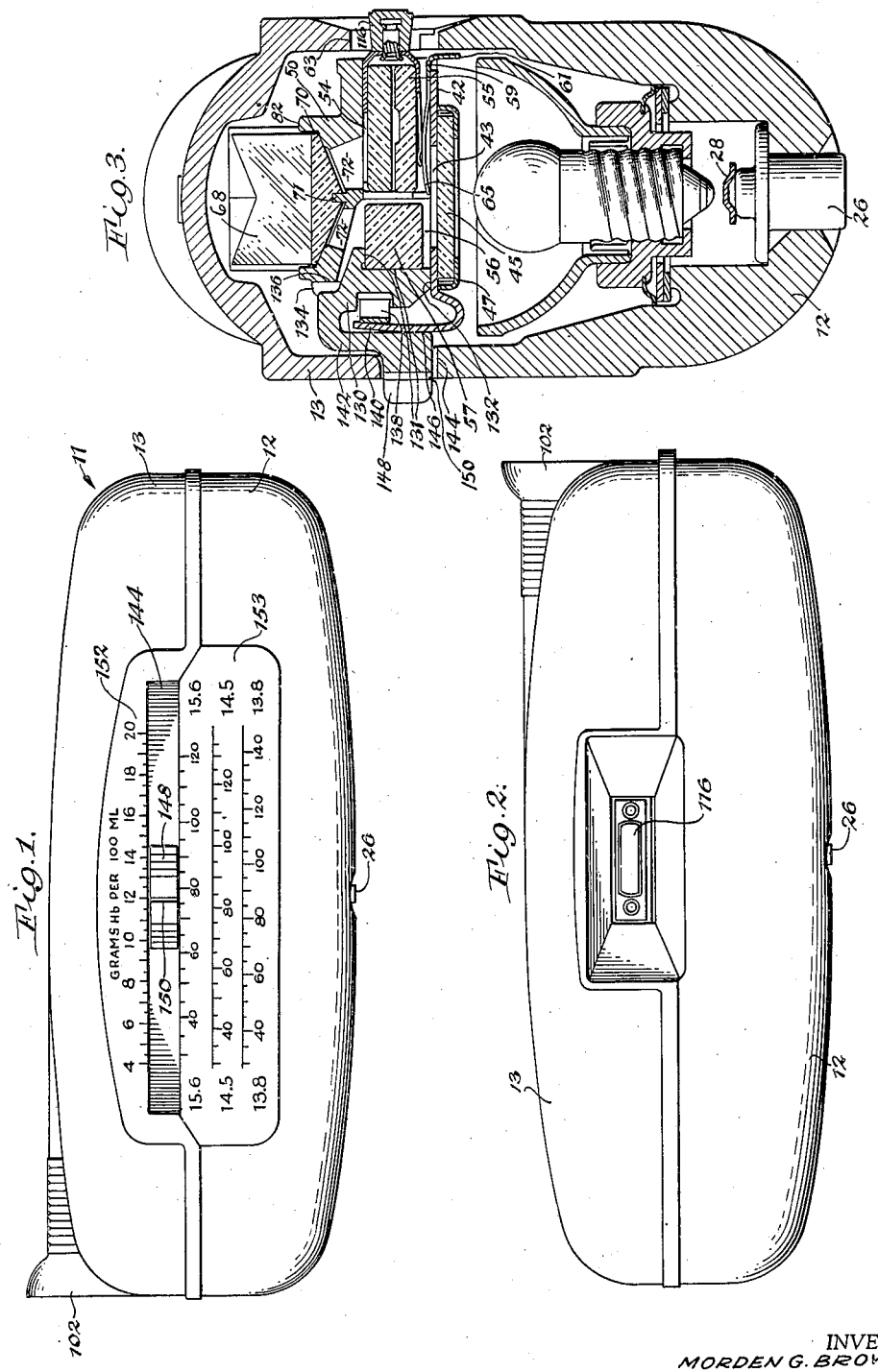
INVENTOR.
MORDEN G. BROWN
HARRY F. LUNDBERG
BY
ATTORNEY Sept. 20, 1949.   M. G. BROWN ET AL   2,482,650
OPTICAL COMPARISON HEMOGLOBINOMETER HAVING A
REFLECTOR SUPPORTING TRANSVERSE PARTITION
Filed Dec. 26, 1945   3 Sheets-Sheet 2
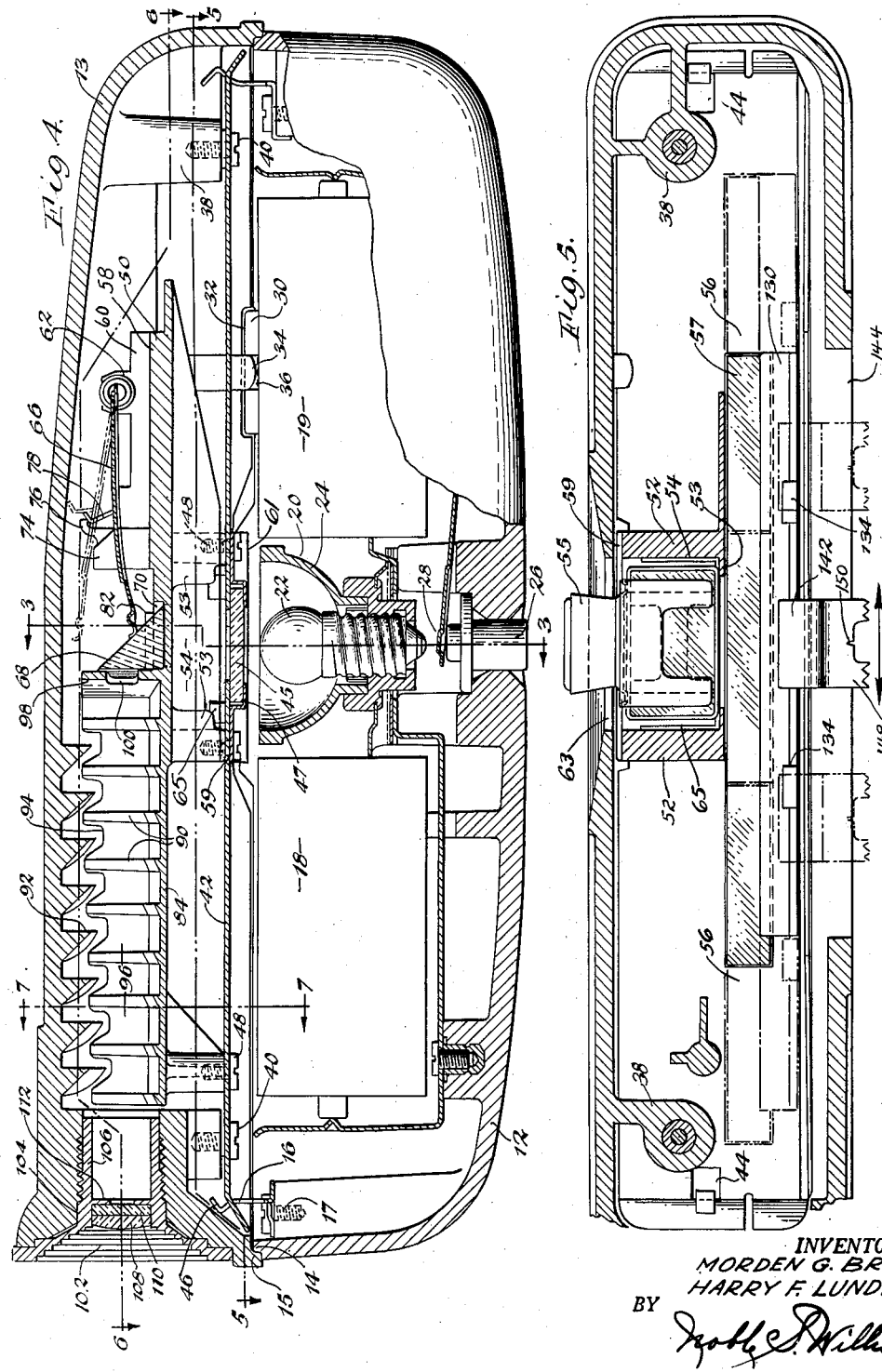
INVENTOR.
MORDEN G. BROWN
HARRY F. LUNDBERG
BY
ATTORNEY

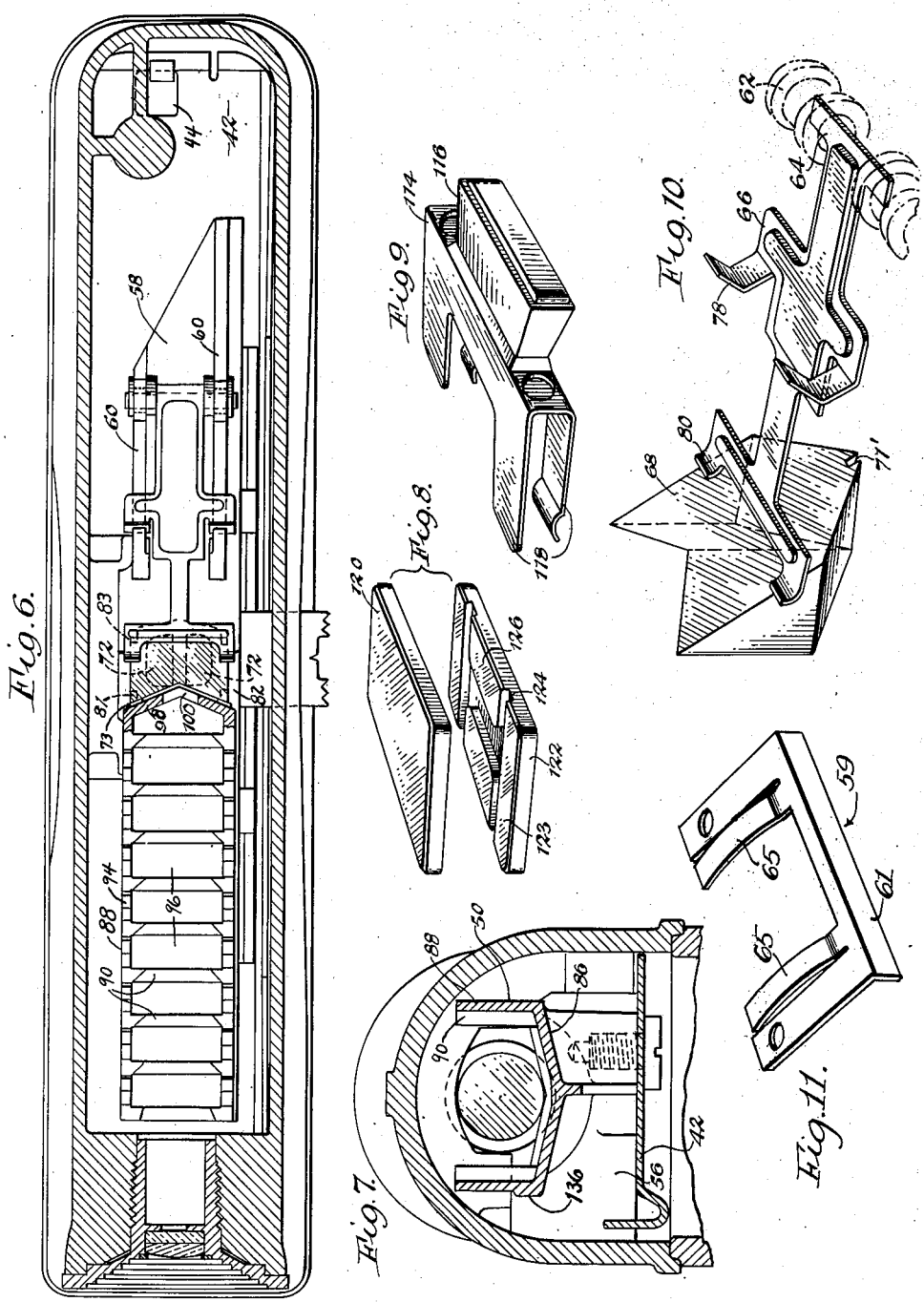

Patented Sept. 20, 1949

2,482,650

UNITED STATES PATENT OFFICE 2,482,650

OPTICAL COMPARISON HEMOGLOBINOMETER HAVING A REFLECTOR SUPPORTING TRANSVERSE PARTITION

Morden G. Brown, Williamsville, and Harry F. Lundberg, Buffalo, N. Y., assignors to American Optical Company, Southbridge, Mass., a voluntary association of Massachusetts Application December 26, 1945, Serial No. 637,230

16 Claims. (Cl. 88—14)

This invention relates to hemoglobinometers, and more particularly to such an instrument which is compact and convenient for use by a physician in his office and which is also readily portable so that it may be easily carried by the physician in his bag and used anywhere when desired for rapidly and accurately examining the hemoglobin content or concentration of a patient's blood. This application is an improvement over co-pending application Serial No. 440,476, filed April 25, 1942, which is issued March 12, 1946, as Patent No. 2,396,260.

In the hemoglobinometer shown and described in said earlier filed application the outer casing is divided generally longitudinally to form two separable sections. The lower of these sections encloses a pair of dry cell batteries and between the batteries are a light bulb and a conical reflector. In transverse alignment with the bulb is a manually operable switch for controlling the operation of the bulb. This switch is purposely located in such a position so as to be convenient for operation by the physician while sighting through the eyepiece and operating the slide of the instrument. The upper of said separable sections of the device contains a partition enclosing and supporting a specimen holder and an adjustable comparison member and adjacent thereto, in transverse alignment with the bulb in said lower section, is a prism reflector arranged to reflect areas of light from portions of the specimen holder and the adjustable comparison member for observation through sighting means in an end wall of said upper section. Also carried on the partition are a diffusing plate and a color filter which project outwardly therefrom and toward the light bulb and the reflector. Accordingly, the amount of space available transversely of the casing for positioning the bulb and reflector and for allowing proper operation of the manual switch was materially limited since the transverse dimension of the casing could not be increased without making the instrument less convenient to handle and use.

Applicant has found that improved results can be obtained by placing the color filter adjacent the sighting means near an end wall of said second section, instead of adjacent the bulb, and, accordingly, providing more room for the bulb and improved reflector. Such construction also affords more space for movement of the manual switch aligned therewith. The positioning of the color filter or light-absorbing member adjacent the eyepiece of the instrument also gives better results since the light-absorbing properties of the filter are more uniform. This is because the light from both areas under observation passes through substantially the same part of the filter, instead of widely separated parts as formerly, and thus there is less chance for variations in density in the filter affecting the matching of the two areas. Also a filter of smaller size can be employed thus reducing the weight and cost of the instrument. Furthermore, the filter which is generally formed of a gelatinous material is in its new location completely enclosed and thus protected from scratches or injury when the instrument is opened for replacement of the bulb or batteries. Since the partition is formed of metal it also forms an improved means for engagement by the catches holding the casing sections together, avoiding the danger of breaking the edge of the molded plastic section which in the former construction was engaged by the catches.

The device of said earlier filed application was arranged with its reflecting member or prism imbedded in a part of the upper section of the casing and held in place jointly by said section and parts carried by the removable partition enclosing the section. Applicant has found that an improved construction may be had by providing means carried entirely and directly by the partition for supporting the prism and a releasable spring member therefor, so that these parts may be readily and correctly assembled and tested, if desired, before they are positioned within the upper casing section.

Improvements in construction over the instrument of said earlier application have also been obtained by providing an integral frame member which is formed so as to provide a support for the prism reflector and said releasable spring, and provide a sighting channel having non-reflecting surfaces formed therein. Said frame member is also formed to provide, in cooperation with said partition, a chamber for receiving the specimen holder and adjacent thereto a guideway for the adjustable comparison member. The construction and arrangement of the instrument with these several parts positioned upon the partition before they are inserted and secured in said casing section provides a convenient and accurate manner and means for positioning and initially optically aligning these parts and produces a stronger more rigid construction. Spring means is provided in the instrument for releasably holding the specimen holder in its operative position in said chamber and other spring means is provided for frictionally holding said adjustable comparison member in its adjusted position.

A more complete understanding of the invention may be had from a consideration of the detailed specification which follows taken in conjunction with the accompanying drawings, in which:

Fig. 1 is a side elevational view of the instrument of the invention as viewed from one side thereof;

Fig. 2 is a similar view but showing the instrument as viewed from the other side thereof;

Fig. 3 is a somewhat enlarged transverse sectional view taken substantially on line 3—3 of Fig. 4;

Fig. 4 is a side view of the instrument similar to Fig. 1 but showing the major portion thereof in section;

Fig. 5 is a transverse sectional view taken substantially upon line 5—5 of Fig. 4;

Fig. 6 is a similar view but taken substantially upon line 6—6 of Fig. 4;

Fig. 7 is a partial transverse sectional view taken upon line 7—7 of Fig. 4;

Fig. 8 is a perspective view showing the plates of a specimen holder, which may be used in the instrument, in spaced relation;

Fig. 9 shows a resilient holder adapted for use with the plates of Fig. 8;

Fig. 10 is a perspective view showing details of the prism reflector and resilient retaining means therefor; and Fig. 11 is a perspective view showing details of a plate employed in the instrument.

Referring to the drawings in detail and particularly Figs. 1–4, the device or instrument shown therein comprises a casing or housing generally indicated by the numeral 11 and formed of two separable sections 12 and 13 having interfitting abutting edges 14 and 15 respectively. These sections may be detachably secured together by resilient clips or catches 16 secured to the first or lower section 12 by suitable means such as screws 17. The sections 12 and 13 are preferably made of molded plastic material but may be formed of any other suitable material desired. The lower section 12 is provided with a pair of longitudinally spaced batteries 18 and 19, of the conventional dry cell flashlight variety, and positioned between the batteries is a light source 20 comprising a bulb 22 and an aspheric reflector 24 which will be later described more fully. A manually operable push button 26 is arranged in transverse alignment with the bulb so that a switch or electrical contact member 28 operated thereby may be moved into contact with the central terminal of the bulb.

The sections 12 and 13 may also be provided with aligning means comprising a pair of upstanding lugs 30 on each of the opposite side edges of one of said sections and each pair adapted to engage in a complementary recess 32 in the other of said sections for aiding in centering the two sections as they are brought together and into closed relation. Each pair of lugs 30 is spaced inwardly of the outer surface of its supporting section so as to engage in its recess 32 inwardly of the outer side wall surface of the section containing the recess. Projections 34 may be formed on one of the sections and slots 36 may be provided in the other of these sections to serve as means for exactly positioning the sections longitudinally relative to each other.

The upper section 13 of the casing is provided with integral upstanding lugs or supports 38 adjacent opposite ends thereof for receiving the screws 40 serving to secure a partition 42 in place in this section and the partition 42 is provided adjacent its opposite ends with apertures 44 arranged to receive the bent upstanding ends 46 of the spring clips 16 and releasably retain the sections 12 and 13 in closed position. The partition 42 is also provided with a central aperture 43 over which may be placed a diffusing plate 45 which may be secured in place by a framing member 47 and screws 48.

The bulb 22, referred to above, is positioned sufficiently below the diffusing plate 45 to give structural clearance between the parts when the sections 12 and 13 are clamped together, and in order to obtain substantially uniform illumination over the exposed central portion of this plate the reflector 24 is made somewhat larger than the conical reflector of the instrument of said earlier filed application and is aspherically shaped. The reflector 24 is so shaped or curved in cross-section that the light reflected thereby onto the plate 45 diminishes in intensity from the outer portions of the diffusing plate toward the center inversely as the direct light from the bulb varies on the plate from the center toward the outer portions thereof. Thus together the bulb and reflector provide substantially uniform illumination over all parts of the plate 45.

Detachably secured upon the partition 42 by said screws 48 is a unitary or integral frame member 50, preferably formed as a die casting, or it might be of molded plastic, and shaped to provide a pair of laterally extending vertical flanges 52 constituting sidewalls for a central chamber 54 disposed, as best seen by Figs. 3 and 5, at one side of the longitudinal vertical central plane of the instrument. In the chamber 54 may be positioned a specimen holder or carrier 55 whose innermost position is limited by a pair of integral stops 53. The frame member 50 is also shaped to provide in conjunction with the partition 42 an elongated longitudinally disposed guideway 56 located at the opposite side of said central vertical plane, and in the guideway 56 is positioned an adjustable comparison member 57. The holder 55 and the comparison member 57 will be hereinafter more fully described. The member 57 is transparent or translucent and may be in the form of a uniformly tapered wedge member or a member having uniformly varying density throughout its length so that, in either case, a member will be provided having known light-absorbing qualities. A plate 59 is clamped between the partition 42 and the unitary frame member 50 by the screws 48 and this plate has a flange 61 extending downwardly adjacent an opening 63 provided between the sections 12 and 13 for reception of the holder 55. Spring arms 65 are formed on plate 59 and arranged to extend into the chamber 54 at opposite sides of the aperture 43 and serve to hold the carrier 55 releasably in position in the instrument and up against the frame member 50.

The frame member or casting 50 is also provided with a horizontal portion 58 spaced above and generally parallel to the partition 42 and this portion serves to support laterally spaced integral upstanding flanges 60 having bearings 62 formed therein for receiving end portions 64 of a spring 66 adapted, when in operative position, to yieldably retain a bi-prism 68 in position against bearing areas 73 and in a recess 70 formed in the upper surface of said horizontal portion 58 immediately above a pair of apertures 72. An integral rib 71 is formed centrally on the frame member 50 and closely fits a longitudinal slot or recess 71' formed in the bottom of the prism 68. Integral arms 74 are also provided on the flanges 60 at opposite sides of the spring 66 and have finger portions 76 engaging over resilient prongs 78 bent upwardly and rearwardly from the body portion of the spring 66 for yieldably retaining the spring in said operative position. The details of construction of the spring and its engagement with the bi-prism 68 are best shown by Fig. 10 wherein it will be seen that the forward portion of said spring is provided with bifurcated arms 80 engaging laterally spaced portions of the prism at points on the sloping rear surface thereof at such locations that the lines of force of the spring will pass through the forward prism supporting areas 81 or between these areas and rear prism supporting areas 83. Small ribs 82 may be provided at opposite sides of the prism 68 for aiding in centering the prism as it is slipped into place in the optical system of the device.

The integral frame member or casting 50 is also provided with an elongated forward portion 84 which is formed in the shape of a channel, see Fig. 7, having a bottom 86 extending outwardly and slightly upwardly from the center of the channel and vertical side wall portions 88. These portions 86 and 88 are provided with a series of inwardly projecting ribs 90 which taper inwardly and thereby form a non-reflecting inner surface throughout the length of said channel. A cooperating non-reflecting wall portion is formed upon the inner surface of the upper molded casing section 13 by a series of transversely arched projections 92 likewise tapering inwardly and fitting into recesses 94 in the upper side wall portions 88 between the ribs 90, thereby forming a substantially enclosed sighting chamber 96 having walls which reflect no light toward sighting means 102 in the end wall of the section 13.

The sighting chamber 96 has an end wall portion 98 formed integrally upon the member 50 and provided with an aperture 100 through which light projecetd by the bulb 22 and passing through the diffusing plate 45, aperture 43, the specimen holder 55 and the comparison member 57 and through apertures 72 and reflected by the prism 68 may travel to reach the color filter 110 and the sighting means 102 in the end wall of section 13. The color filter is formed of glass, plastic or gelatinous material which is adapted to transmit light of only a predetermined character, that is light of only a certain predetermined portion of the spectrum. The sighting means 102 is threaded into a sight opening 104 and comprises a tubular portion 106 containing a lens element 108 and the color filter or filtering member 110 positioned adjacent an apertured diaphragm 112. It will be obvious that light transmitted through the specimen holder 55 and light transmitted through the adjustable comparison member 57 will be reflected by the prism 68 and may be simultaneously observed through sighting means 102 and color filter 110 and any difference in intensity occurring therebetween may be easily observed by the operator sighting through sighting means 102.

As best seen in Figs. 3, 8 and 9, the specimen holder 55 comprises a resilient clip 114 having a handle 116 and spaced pairs of arms 118 arranged to resiliently engage opposite sides of a pair of specimen-receiving plates 120 and 122 and hold same in an engaging position for positioning in chamber 54 of the device. The upper and lower surfaces of the plate 120 are accurately formed so as to be parallel and the plate 122 has its lower surface and its spaced upper side rails 123 likewise in parallel relation while an intermediate part of the plate 122 is provided with grooves 124 for forming specimen-receiving areas 126 which are arranged to lie slightly below the plane of the side rails 123 so as to form a space between each of the areas 126 and the bottom of the cover plate 120 positioned thereover, said space being of predetermined thickness for a purpose to be hereinafter described.

The adjustable comparison member 57 may be cemented or otherwise secured along the surfaces 131 to an elongated slide or carrier 130 which is arranged to fit within the guideway 56 and rest at 132 upon the upper surface of the partition 42 so that it may be moved therealong when the device is in operation. Spaced lugs 134 are also provided on the upper part of the carrier 130 and engage at 136 an outer side wall portion of the frame member 50. An elongated spring 138 has its opposite ends positioned in recesses in the carrier 130 and its central portion bears against the inner surface of an upstanding flange 140 formed integrally along one side of the partition 42. An operating arm 142, extending laterally over the upper edge of the flange 140 and then downwardly to a position opposite an elongated slot 144 formed in the casing 11 between adjacent edge portions of the sections 12 and 13, has sliding engagement with the outer surface of the flange 140 as indicated at 146, and this arm 142, together with the bearing surfaces 132, 136 and spring 138, serves to yieldably and frictionally maintain the carrier in an adjusted position and allows the carrier to be moved longitudinally to position various portions of the comparison member 57 opposite the specimen holder 55 in the chamber 54. A finger portion 148 is formed on the arm 142 and projects through the slot 144 to serve as a handle when the slide is to be adjusted, said finger being provided centrally thereof with a mark or groove 150 to serve as an indication of the position of the slide relative to a scale or scales on the outside of the casing 11. By providing a scale 152 or a set of scales 153 adjacent the slot 144, an indication of the hemoglobin concentration of the blood may be observed.

Different methods of use of the device of the invention may be employed. For example, one method may be performed in the following way: A drop of blood extracted from a patient's fingertip or ear lobe may be placed upon the area 126 of the plate 122 and stirred by a stick or the like having a minute amount of hemolytic agent carried on the end thereof to convert the blood specimen into a solution wherein the red pigment or hemoglobin of the blood is substantially evenly distributed throughout the specimen. The cover plate 120 is then positioned thereover to spread the specimen and restrict same to a layer of predetermined thickness. The holder 55 may then be inserted into the chamber 54 of the instrument through aperture 63 and inspected. When the comparison member 57 has been moved longitudinally to a position to give equal light-absorption to that of the specimen being examined a reading may be taken on one of the scales 153, depending upon the patient being examined and the particular standard being used by the operator or physician, to indicate the hemoglobin concentration of the specimen. This method and the apparatus employed therewith is described in greater detail and claimed in copending application No. 627,873, filed November 10, 1945.

Another method of use of the instrument would employ a specimen of untreated whole blood which is placed in the holder 55 and inspected and compared in the instrument without being hemolyzed. Under such a condition a reading might be taken on the scale 152 to indicate the hemoglobin concentration. Such use of the instrument obviously might be performed more rapidly but would not give as accurate results since the hemoglobin thereof would be confined in the individual cells separated by clear plasma and thus the true concentration thereof would not be directly reflected in the light-absorbing properties of the specimen as a whole.

Throughout the specification the two separable parts of the casing 11 have been referred to as the "lower section" and the "upper section." It is here pointed out that the terms have been used as a matter of convenience and that the instrument may as readily be used with either section upwardly, or may be used equally well with the sections disposed side by side. Accordingly, such terms should not limit the invention but be considered only as descriptive.

Having described the invention, we claim:

1. A portable device of the character described comprising an elongated casing, said casing being divided generally longitudinally thereof to form first and second sections, battery means and a light source in said first section, a removable partition carried by said second section and having an aperture formed therein, an integral frame member supported by said partition and arranged to form therewith an elongated guideway and a chamber adjacent said aperture, an adjustable comparison member arranged in said guideway and a removable specimen holder positioned in said chamber, a reflector, means integral with said frame member for supporting and positioning said reflector in optical alignment with adjacent portions of said adjustable member and said holder, and sighting means in an end wall of said casing for viewing light from said adjacent portions and reflected by said reflector when illuminated by said light source.

2. A portable device of the character described comprising an elongated casing, said casing being divided generally longitudinally thereof to form first and second sections, battery means and a light source in said first section, a removable partition carried by said second section and having an aperture formed therein, a unitary frame member supported by said partition and arranged to form therewith an elongated guideway and a chamber adjacent said aperture, an adjustable comparison member arranged in said guideway and a removable specimen holder positioned in said chamber, a reflector, means formed as an integral part of said frame member for supporting and positioning said reflector in optical alignment with adjacent portions of said adjustable member and said holder, releasable means carried by said frame member for yieldably holding said reflector in its operative position, and sighting means in an end wall of said casing for viewing light from said adjacent portions and reflected by said reflector when illuminated by said light source.

3. A portable device of the character described comprising an elongated casing, said casing being divided generally longitudinally thereof to form first and second sections, battery means and a light source in said first section, a removable partition carried by said second section and having an aperture formed therein, a unitary frame member supported by said partition and arranged to form therewith an elongated guideway and a chamber adjacent said aperture, an adjustable comparison member arranged in said guideway and a removable specimen holder positioned in said chamber, a reflector, means formed as an integral part of said frame member for supporting and positioning said reflector in optical alignment with adjacent portions of said adjustable member and said holder, sighting means in an end wall of said casing optically aligned with said reflector for viewing light from said adjacent portions and reflected by said reflector when illuminated by said light source, and a sighting channel formed by an integral part of said frame member and partially enclosing a substantial portion of the optical path between said sighting means and said reflector and being provided with non-reflecting interior surfaces.

4. A portable device of the character described comprising an elongated casing, said casing being divided generally longitudinally thereof to form first and second sections, battery means and a light source in said first section, a removable partition carried by said second section and having an aperture formed therein, a unitary frame member supported by said partition and arranged to form therewith an elongated guideway and a chamber having portions adjacent said aperture, an adjustable comparison member arranged in said guideway and a removable specimen holder positioned in said chamber, a reflector, means formed as a unitary part of said frame member for supporting and accurately positioning said reflector in optical alignment with adjacent portions of said adjustable member and said holder, releasable means carried by said frame member for yieldably holding said reflector in operative position, sighting means in an end wall of said casing optically aligned with said reflector for viewing light from said adjacent portions and reflected by said reflector when illuminated by said light source, and a sighting channel formed integrally with said frame member and partially enclosing a substantial portion of the optical path between said sighting means and said reflector and being provided with non-reflecting interior surfaces.

5. A portable device of the character described comprising an elongated casing, said casing being divided generally longitudinally thereof to form separable first and second sections, battery means and a light source in said first section, a removable partition carried by said second section and having a central aperture and a pair of end apertures formed therein, a pair of resilient catches carried by the first section and engaging in said end apertures for releasably retaining said sections in operative relation, a unitary frame member supported by said partition and being removable therewith, and being arranged to form with said partition an elongated guideway and a chamber having portions adjacent said central aperture, an adjustable comparison member arranged in said guideway and a removable specimen holder positioned in said chamber, a reflector, mounting means formed as a unitary part of said frame member for supporting and accurately positioning said reflector in optical alignment with adjacent portions of said adjustable member and said holder, and sighting means in an end wall of said casing for viewing light from said adjacent portions and reflected by said reflector when illuminated by said light source.

6. A portable device of the character described comprising an elongated casing, said casing being divided generally longitudinally thereof to form separable first and second sections, battery means and a light source in said first section, a removable partition carried by said second section and having a central aperture and a pair of end apertures formed therein, a pair of resilient catches carried by the first section and engaging in said end apertures for releasably retaining said sections in operative relation, a unitary frame member supported by said partition and being removable therewith, and being arranged to form with said partition an elongated guideway and a chamber having portions adjacent said central aperture, an adjustable comparison member arranged in said guideway and a removable specimen holder positioned in said chamber, a reflector, mounting means formed as a unitary part of said frame member for supporting and accurately positioning said reflector in optical alignment with adjacent portions of said adjustable member and said holder, releasable means carried by said frame member and yieldably holding said reflector in operative position, and sighting means in an end wall of said casing for viewing light from said adjacent portions and reflected by said reflector when illuminated by said light source.

7. A portable device of the character described comprising an elongated casing, said casing being divided generally longitudinally thereof to form separable first and second sections, battery means and a light source in said first section, a removable partition carried by said second section and having a central aperture and a pair of end apertures formed therein, a pair of resilient catches carried by the first section and engaging in said end apertures for releasably retaining said sections in operative relation, a unitary frame member supported by said partition and being removable therewith, and being arranged to form with said partition an elongated guideway and a chamber having portions adjacent said central aperture, an adjustable comparison member arranged in said guideway and a removable specimen holder positioned in said chamber, a reflector, mounting means formed as a unitary part of said frame member for supporting and accurately positioning said reflector in optical alignment with adjacent portions of said adjustable member and said holder, sighting means in an end wall of said casing optically aligned with said reflector for viewing light from said adjacent portions and reflected by said reflector when illuminated by said light source, and a sighting channel formed integrally with said frame member and partially enclosing a substantial portion of the optical path between said sighting means and said reflector and being provided with non-reflecting interior surfaces.

8. A portable device of the character described comprising an elongated casing, said casing being divided generally longitudinally thereof to form separable first and second sections, battery means and a light source in said first section, a removable partition carried by said second section and having a central aperture and a pair of end apertures formed therein, a pair of resilient catches carried by the first section and engaging in said end apertures for releasably retaining said sections in operative relation, a unitary frame member supported by said partition and being removable therewith, and being arranged to form with said partition an elongated guideway and a chamber having portions adjacent said central aperture, an adjustable comparison member arranged in said guideway and a removable specimen holder positioned in said chamber, a reflector, mounting means formed as an integral part of said frame member for supporting and accurately positioning said reflector in optical alignment with adjacent portions of said adjustable member and said holder, releasable means carried by said frame member and yieldably holding said reflector in operative position, sighting means in an end wall of said casing optically aligned with said reflector for viewing light from said adjacent portions and reflected by said reflector when illuminated by said light source, and a sighting channel formed integrally with said frame member and partially enclosing a substantial portion of the optical path between said sighting means and said reflector and being provided with non-reflecting interior surfaces.

9. A portable device of the character described comprising an elongated casing, said casing being divided generally longitudinally thereof to form first and section sections, battery means and a light source in said first section, a removable partition carried by said second section and having an aperture formed therein, an integral frame member supported by said partition and being removable therewith, and being arranged to form therewith an elongated guideway and a chamber having portions adjacent said aperture, an adjustable comparison member arranged in said guideway and a removable specimen holder positioned in said chamber, a reflector, means formed as an integral part of said frame member for supporting and accurately positioning said reflector in optical alignment with adjacent portions of said adjustable member and holder, said partition having formed along one longitudinal side thereof an integral flange extending away from the plane of said partition and forming an enclosing wall for said guideway, a carrier for guiding said adjustable comparison member in said guideway, said carrier having an operating arm secured thereto and extending outwardly of said flange and through an elongated slot in a side wall of said casing so as to form an exposed finger accessible to the operator of the device, and sighting means in an end wall of said casing for viewing light from said adjacent portions and reflected by said reflector when illuminated by said light source.

10. A portable device of the character described comprising an elongated casing, said casing being divided generally longitudinally thereof to form first and second sections, battery means and a light source in said first section, a removable partition carried by said second section and having an aperture formed therein, an integral frame member supported by said partition and being removable therewith, and being arranged to form therewith an elongated guideway and a chamber having portions adjacent said aperture, an adjustable comparison member arranged in said guideway and a removable specimen holder positioned in said chamber, a reflector, means formed as an integral part of said frame member for supporting and accurately positioning said reflector in optical alignment with adjacent portions of said adjustable member and holder, said partition having formed along one longitudinal side thereof an integral flange extending away from the plane of said partition and forming an enclosing wall for said guideway, a carrier for guiding said adjustable comparison member in said guideway, said carrier having an operating arm secured thereto and extending outwardly of said flange and through an elongated slot in a side wall of said casing so as to form an exposed finger accessible to the operator of the device, sighting means in an end wall of said casing for viewing light from said adjacent portions and reflected by said reflector when illuminated by said light source, and spring means between a surface of said flange and said carrier for urging said carrier into frictional slidable engagement with wall portions of said guideway.

11. A portable device of the character described comprising an elongated casing, said casing being divided generally longitudinally thereof to form first and second sections, battery means and a light source in said first section, a removable partition carried by said second section and having an aperture formed therein, an integral frame member supported by said partition and being removable therewith, and being arranged to form therewith an elongated guideway and a chamber having portions adjacent said aperture, an adjustable comparison member arranged in said guideway and a removable specimen holder positioned in said chamber, resilient arms in said chamber and longitudinally spaced at opposite sides of said aperture for yieldably retaining said holder in operative position, a reflector, means formed as an integral part of said frame member for supporting and accurately positioning said reflector in optical alignment with adjacent portions of said adjustable member and holder, and sighting means in an end wall of said casing for viewing light from said adjacent portions and reflected by said reflector when illuminated by said light source.

12. A portable device of the character described comprising an elongated casing, said casing being divided generally longitudinally thereof to form first and second sections, battery means and a light source in said first section, a removable partition carried by said second section and having an aperture formed therein, an integral frame member supported by said partition and being removable therewith, and being arranged to form therewith an elongated guideway and a chamber having portions adjacent said aperture, an adjustable comparison member arranged in said guideway and a removable specimen holder positioned in said chamber, resilient arms in said chamber and longitudinally spaced at opposite sides of said aperture for yieldably retaining said holder in operative position, a reflector, means formed as a unitary part of said frame member for supporting and accurately positioning said reflector in optical alignment with adjacent portions of said adjustable member and holder, releasable means carried by said frame member for yieldably holding said reflector in operative position, and sighting means in an end wall of said casing for viewing light from said adjacent portions and reflected by said reflector when illuminated by said light source.

13. A portable device of the character described comprising an elongated casing, said casing being divided generally longitudinally thereof to form first and second sections, battery means and a light source in said first section, a removable partition carried by said second section and having an aperture formed therein, a unitary frame member supported by said partition and being removable therewith, and being arranged to form therewith an elongated guideway and a chamber having portions adjacent said aperture, an adjustable comparison member arranged in said guideway and a removable specimen holder positioned in said chamber, resilient arms in said chamber and longitudinally spaced at opposite sides of said aperture for yieldably retaining said holder in operative position, a reflector, means formed as a unitary part of said frame member for supporting and accurately positioning said reflector in optical alignment with adjacent portions of said adjustable member and holder, sighting means in an end wall of said casing optically aligned with said reflector for viewing light from said adjacent portions and reflected by said reflector when illuminated by said light source, and a sighting channel formed integrally with said frame member and partially enclosing a substantial portion of the optical path between said sighting means and said reflector, said channel being provided with non-reflecting interior surfaces.

14. A portable device of the character described comprising an elongated casing, said casing being divided generally longitudinally thereof to form first and second sections, battery means and a light source in said first section, a removable partition carried by said second section and having an aperture formed therein, a unitary frame member supported by said partition and being removable therewith, and being arranged to form therewith an elongated guideway and a chamber having portions adjacent said aperture, an adjustable comparison member arranged in said guideway and a removable specimen holder positioned in said chamber, resilient arms in said chamber and longitudinally spaced at opposite sides of said aperture for yieldably retaining said holder in operative position, a reflector, means formed as a unitary part of said frame member for supporting and accurately positioning said reflector in optical alignment with adjacent portions of said adjustable comparison member and holder, releasable means carried by said frame member for yieldably holding said reflector in operative position, sighting means in an end wall of said casing optically aligned with said reflector for viewing light from said adjacent portions and reflected by said reflector when illuminated by said light source, and a sighting channel formed integrally with said frame member and partially enclosing a substantial portion of the optical path between said sighting means and said reflector, said channel being provided with non-reflecting interior surfaces.

15. A portable device of the character described comprising an elongated casing divided generally longitudinally so as to form separable first and second sections, battery means and a light source in said first section and a manually operable switch connected thereto, sighting means in an end wall of said second section, a transversely disposed partition detachably secured to said second section adjacent the peripheral edge thereof and arranged to substantially enclose the interior thereof when said sections are separated, an adjustable comparison member and a specimen holder in said second section, unitary supporting means carried by and cooperating with said partition for providing a longitudinal guideway for said comparison member and a chamber for said specimen holder, a reflector transversely aligned with said chamber and an adjacent portion of said guideway, and accurately formed opposed surfaces on said unitary supporting means arranged to engage portions of said reflector and fixedly support said reflector so as to direct light from said light source and transmitted simultaneously by said comparison member and a specimen when positioned in said specimen holder toward said sighting means.

16. A portable device of the character described comprising an elongated casing divided generally longitudinally so as to form separable first and second sections, battery means and a light source in said first section and a manually operable switch connected thereto, sighting means in an end wall of said second section, a transversely disposed partition detachably secured to said second section adjacent the peripheral edge thereof and arranged to substantially enclose the interior thereof when said sections are separated, an adjustable comparison member and a specimen holder in said second section, unitary supporting means carried by and cooperating with said partition for providing a longitudinal guideway for said comparison member and a chamber for said specimen holder, a reflector transversely aligned with said chamber and an adjacent portion of said guideway, accurately formed opposed surfaces on said unitary supporting means arranged to engage portions of said reflector and fixedly support said reflector so as to direct light from said light source and transmitted simultaneously by said comparison member and a specimen when positioned in said specimen holder toward said sighting means, and filtering means of predetermined characteristics carried by said second section in a position so as to filter the light before same passes to said sighting means.

MORDEN G. BROWN.
HARRY F. LUNDBERG.

REFERENCES CITED

The following references are of record in the file of this patent:

UNITED STATES PATENTS

| Number | Name | Date |
|---|---|---|
| 2,355,960 | Duffie | Aug. 15, 1944 |
| 2,396,260 | Gradisar et al. | Mar. 12, 1946 |